United States Patent
Schmieder

(10) Patent No.: US 10,940,607 B2
(45) Date of Patent: Mar. 9, 2021

(54) MACHINING DEVICE

(71) Applicant: HOMAG GMBH, Schopfloch (DE)

(72) Inventor: Volker Schmieder, Mössingen (DE)

(73) Assignee: HOMAG GMBH, Schopfloch (DE)

( * ) Notice: Subject to any disclaimer, the term of this patent is extended or adjusted under 35 U.S.C. 154(b) by 293 days.

(21) Appl. No.: 15/764,434

(22) PCT Filed: Sep. 16, 2016

(86) PCT No.: PCT/EP2016/072044
§ 371 (c)(1),
(2) Date: Mar. 29, 2018

(87) PCT Pub. No.: WO2017/055111
PCT Pub. Date: Apr. 6, 2017

(65) Prior Publication Data
US 2018/0272557 A1    Sep. 27, 2018

(30) Foreign Application Priority Data

Sep. 29, 2015  (DE) ..................... 10 2015 218 814.0

(51) Int. Cl.
*B27M 1/08* (2006.01)
*B27F 1/02* (2006.01)
*B23Q 7/04* (2006.01)

(52) U.S. Cl.
CPC .................. *B27M 1/08* (2013.01); *B27F 1/02* (2013.01); *B23Q 7/047* (2013.01); *B23Q 2230/006* (2013.01); *B23Q 2240/007* (2013.01)

(58) Field of Classification Search
CPC .. B25B 11/00; B23Q 3/00; B23Q 3/06; B23Q 3/069; B27C 5/00; B27C 5/02; B27C 5/06; B27M 1/08

USPC .... 29/281.1, 281.5, 281.3, 281.4, 563, 33 P; 409/219, 145, 159, 172; 144/242.1, 144/245.1, 245.2, 245.3, 250.21, 250.23, 144/250.24, 250.25, 253.1, 253.4, 253.5, 144/253.6, 253.7, 253.8, 253.9
See application file for complete search history.

(56) References Cited

FOREIGN PATENT DOCUMENTS

| AT | 514870 A2 | 4/2015 |
|----|-----------|--------|
| CN | 1701915 A | 11/2005 |
| DE | 101 37 839 A1 | 2/2003 |
| DE | 102 43 394 A1 | 4/2004 |
| DE | 10 2006 007 700 A1 | 8/2007 |
| DE | 10 2014 013 423 A1 | 3/2015 |
| EP | 1 281 491 A2 | 2/2003 |

(Continued)

OTHER PUBLICATIONS

International Search Report, PCT/EP2016/072044, dated Nov. 17, 2016, 3 pgs.
(Continued)

*Primary Examiner* — Matthew Katcoff
(74) *Attorney, Agent, or Firm* — Paul D. Strain, Esq.; Strain & Strain PLLC

(57) ABSTRACT

The invention relates to a machining device, in particular for machining workpieces made from wood, wood materials, plastic or the like, having at least one workpiece table with a first workpiece holder for holding at least one workpiece, furthermore with a second workpiece holder for holding at least one workpiece, wherein the workpiece can be positioned in at least two dimensions, advantageously in three dimensions, during a re-clamping operation from the first workpiece holder into the second workpiece holder.

23 Claims, 5 Drawing Sheets

(56) References Cited

FOREIGN PATENT DOCUMENTS

| | | |
|---|---|---|
| EP | 1 304 188 A2 | 4/2003 |
| EP | 1 600 254 A1 | 11/2005 |
| EP | 1 810 802 A1 | 7/2007 |
| EP | 1 992 464 A2 | 11/2008 |
| EP | 2 105 269 A2 | 9/2009 |
| EP | 2 363 260 A1 | 9/2011 |
| EP | 2 363 260 B1 | 7/2013 |

OTHER PUBLICATIONS

German Search Report, Appl. No. 10 2015 218 814.0, dated Jul. 15, 2016, 8 pgs.

MACHINING DEVICE

CROSS-REFERENCE TO RELATED PATENT APPLICATIONS

This application is a National Stage of International Application No. PCT/EP2016/072044, filed Sep. 16, 2016, which is based upon and claims the benefit of priority from prior German Patent Application No. 10 2015 218 814.0, filed Sep. 29, 2015, the entire contents of all of which are incorporated herein by reference in their entirety.

SPECIFICATION

Technical Field

The invention relates to a machining device, in particular for machining workpieces from wood, wood materials, plastic, or the like, in particular as claimed in the preamble of claim 1, and to a method for operating such a machining device.

Prior Art

A multiplicity of machining devices for machining workpieces, in particular for machining workpieces from wood, wood materials, plastic, or the like, are known in the prior art. Such machining devices usually have a workpiece table having a workpiece mounting by way of which a workpiece can be disposed and at least temporarily held in a clamping manner in order for the workpiece to be machined during the clamping mounting. Such workpiece tables having workpiece mountings can be configured so as to be substantially stationary or displaceable by means of advancing installations.

In the case of a substantially stationary embodiment of the workpiece table having the workpiece mounting, the tool herein for machining the workpiece can be guided toward the workpiece per se so as to effect machining of the workpiece by virtue of relative movement generated between the workpiece and the tool.

Alternatively thereto, in the case of a substantially displaceable embodiment of the workpiece having the workpiece mounting, the workpiece for machining can be guided toward the tool per se so as to effect machining of the workpiece by virtue of a relative movement generated between the workpiece and the tool.

To this end, the machining device can have, for example, a stationary or displaceable gantry or a stationary or displaceable outrigger, or similar, on which the tool for machining the workpiece in turn can be guided in a stationary or displaceable manner so as to, conjointly with any potential displacement of the workpiece, be able to perform the envisaged machining on the workpiece. Either the workpiece can be moved past the tool herein, or vice versa, or else both the workpiece and the tool can be displaced when machining such that a targeted relative movement is provided between the tool and the workpiece as to be able to machine the workpiece, for example along one side or edge.

It has thus become known by way of DE 101 37 839 A1 that two workpiece tables are disposed in a displaceable manner beside one another, wherein either the one or the other workpiece table by way of the workpiece mounting thereof holds the workpiece, while the workpiece table by means of the advancing installations thereof is moved past the tool so as to machine a lateral edge of the workpiece. Subsequently, the one workpiece table can be displaced in relation to the other workpiece table to a transfer position, and the workpiece without any change of position can be re-chucked from the one workpiece table directly to the other workpiece table, such that the as yet non-machined other lateral edge of the workpiece can be subsequently machined.

However, the required height of the workpiece for chucking herein is constant because the chuck jaws of the workpiece mounting or the workpiece table are fixedly predefined and the lower chuck jaws in terms of their height on the workpiece table are fixed. However, if a workpiece having a contour which has different heights at the two opposite lateral edges is to be machined, for example because the respective lower edge is to be configured in a manner offset to the other, then this workpiece cannot be readily machined by means or the machining device thus configured because there is no defined state available for re-chucking when re-chucking from one workpiece table to the other workpiece table.

In the production of window frame parts, in particular from wood, a large variety of different profiles have to be generated which is usually carried out by milling. Both the longitudinal sides and the narrow sides of the frame parts are usually to be machined herein. In order to allow the increased incident of light that is being increasingly desired into living spaces, the widths at the window frame parts are being increasingly reduced. This leads to vacant clamping faces on the window frame parts for holding the window frame parts in the chuck jaws of the workpiece mounting being available for the subtractive machining of the workpiece only to a very limited extent, wherein this problem increasingly arises once the profile of a first longitudinal side of the window frame part has already been machined.

In the case of workpiece tables according to DE 101 37 839 A1, the provided chuck jaws, of the workpiece mounting as fixing elements bear on the lower and on the upper bearing face of the window frame part, thus clamping the workpiece therebetween. This has indeed the advantage that the workpiece in chucking and re-chucking procedures can maintain a constant height level in the vertical direction and, optionally, also a constant position in the lateral direction, but there is however also the disadvantage that chucking can only take place on the upper and lower bearing faces.

However, in the case of modern window frame parts as workpieces it is becoming increasingly necessary that the workpiece can also be chucked in regions of the lateral profiling that have already been machined, thus for example in rabbets that have already been produced.

SUMMARY OF THE INVENTION, OBJECT, ACHIEVEMENT, ADVANTAGES

It is the object of the invention to achieve a machining, device which also in the case of comparatively short workpieces enables a significant increase in terms of machining, efficiency. It is also the object of the invention to provide a respective method.

This object in terms the machining device is achieved by the features of claim 1.

An exemplary embodiment of the invention relates to a machining device, in particular for machining workpieces from wood, wood materials, plastic, or the like, having at least one workpiece table having a first workpiece mounting for holding at least one workpiece, furthermore having a second workpiece mounting, for holding at least one workpiece, wherein the workpiece, when being re-chucked from the first workpiece mounting to the second workpiece mounting, is positionable in at least two dimensions, advantageously in three dimensions. It is advantageous herein for the workpiece to be transferred, to be able to be transferred, respectively, directly from the first workpiece mounting to the second workpiece mounting or vice versa without a manipulator or any further feed device being provided or performing the transfer. It is thus achieved that workpieces which have previously already been machined on one side, for example, and optionally no longer have the full lateral height, by displacing or by corresponding positioning, respectively, are also able to be fitted into the respective workpiece mounting and are able to be held therein in a positionally correct manner for further machining.

It is particularly advantageous when the first workpiece mounting is displaceable relative to the second workpiece mounting in at least two, advantageously in three, dimensions, and/or the second workpiece mounting is displaceable relative to the first workpiece mounting in at least two, advantageously in three, dimensions. It is achieved on account thereof that a workpiece is positionable in a workpiece mounting in such a manner that said workpiece can be fitted into the other workpiece mounting, and in particular can be fitted in another position than in the workpiece mounting prior to the transfer.

It is particularly advantageous when one workpiece table, in particular only one workpiece table, is provided, and the first workpiece mounting and/or the second workpiece mounting are/is disposed so as to be displaceable relative to the workpiece table. The workpiece table herein can be configured so as to be displaceable or else stationary, wherein the workpiece for machining thereof is either displaced conjointly with the workpiece table, or said workpiece can also be stationary conjointly with the workpiece table while a displaceable tool, for example, is provided for machining the workpiece.

It is also particularly advantageous when two displaceable workpiece tables are provided, wherein the first workpiece mounting is connected to a first workpiece table and is disposed so as to be displaceable conjointly with the latter, and the second workpiece mounting is connected to the second workpiece table and is disposed so as to be displaceable conjointly with the latter. The workpiece herein can be displaced conjointly with the respective first or second workpiece table, depending on the workpiece mounting in which the workpiece is chucked.

It is also advantageous herein when the first workpiece mounting has a plurality of first chuck elements which are disposed on the first workpiece table, wherein the first chuck elements have first and second chuck jaws which are displaceable at least in one dimension or in two dimensions relative to one another and in particular also relative to the first workpiece table, and wherein the second workpiece mounting has a plurality of second chuck elements which are disposed on the second workpiece table, wherein the second chuck elements have first and second chuck jaws which are displaceable in at least one dimension or in two dimensions relative to one another and in particular also relative to the second workpiece table. A respective displacement and positioning of the workpiece can thus be performed in a chucking arrangement of one workpiece mounting, so as to transfer said workpiece in a further chucking arrangement of another workpiece mounting.

It is particularly advantageous herein when the first and/or the second workpiece table are/is displaceable in a longitudinal direction. Effective machining of a workpiece or of workpieces can be performed on account thereof because the workpiece tables are optionally also displaceable in an alternating manner and can be moved past tools in order for machining to be achieved.

It is particularly advantageous when the first and/or the second workpiece table are/is displaceable in a first direction that is perpendicular to the longitudinal direction. It can thus be achieved, for example, that the chuck elements or the workpiece mountings are displaceable in a converging manner in order for the workpiece to be transferred.

Alternatively or additionally, it is also advantageous when the first chuck elements, or the first and/or second chuck jaws thereof, respectively, are in each case displaceable in a first direction that is aligned so as to be perpendicular to the longitudinal direction and, optionally, in a second direction that is aligned so as to be perpendicular to the longitudinal direction and to the first direction, and/or the second chuck elements, or the first and/or second chuck jaws thereof, respectively, are in each case displaceable in a first direction that is aligned so as to be perpendicular to the longitudinal direction and, optionally, are displaceable in a second direction that is aligned so as to be perpendicular to the longitudinal direction and to the first direction. A displacement or the workpiece can also be performed in this manner in order to achieve a transfer of the workpiece from one workpiece mounting to a second workpiece mounting.

In the case of a further design embodiment it is also advantageous when the one workpiece table is disposed so as not to be displaceable. Said workpiece table can thus be constructed as a stationary console, wherein the tool that is provided for the machining of the workpiece is advantageously displaceable in a corresponding manner.

It is furthermore expedient when the first workpiece mounting has a plurality of first chuck elements which are disposed on the workpiece table, wherein the first chuck elements have first and second chuck jaws which are displaceable in at least one dimension or in two dimensions relative to one another and in particular also relative to the workpiece table, and wherein the second workpiece mounting has a plurality of second chuck elements which are disposed on the workpiece table, wherein the second chuck elements have first and second chuck jaws which are displaceable in at least one dimension or in two dimensions relative to one another and in particular also relative to the workpiece table.

It is also advantageous herein when the first chuck elements, or the first and/or second chuck jaws thereof, respectively, are displaceable also in a third dimension, and/or the second chuck elements, or the first and/or second chuck jaws thereof, respectively, are displaceable also in a third dimension.

According to the invention it is also advantageous when a feed device by means of which a workpiece is feedable to one of the workpiece mountings is provided.

Machining in the context of the invention means routing, sawing, drilling, lettering, adhesively bonding, coating, gluing, and/or surface treating, etc.

Further advantageous design embodiments are described by the description of figures hereunder and by the dependent claims.

BRIEF DESCRIPTION OF THE DRAWINGS

The invention will be explained in more detail hereunder based on at least one exemplary embodiment by means of the drawings, in which.

PREFERRED EMBODIMENT OF THE INVENTION

Figure 1:
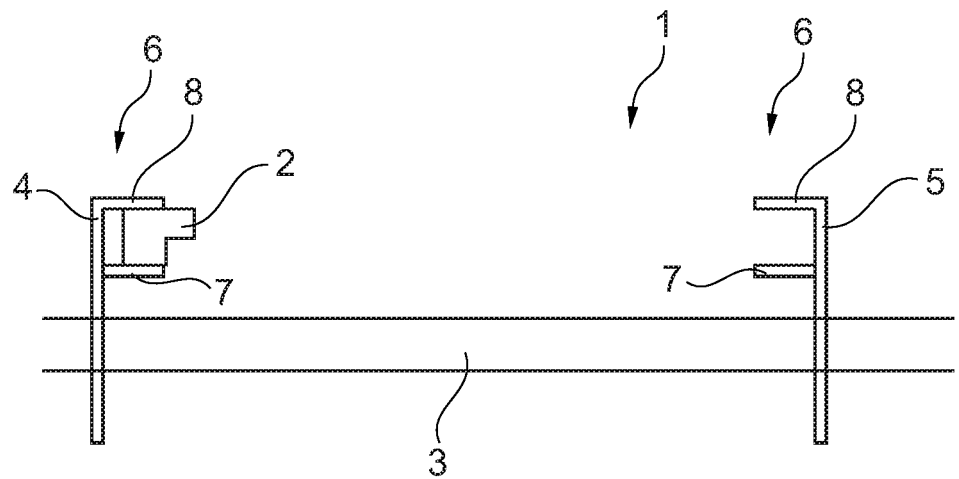
FIG. 1 shows a schematic illustration for explaining a machining device according to the invention.
Figure 2:
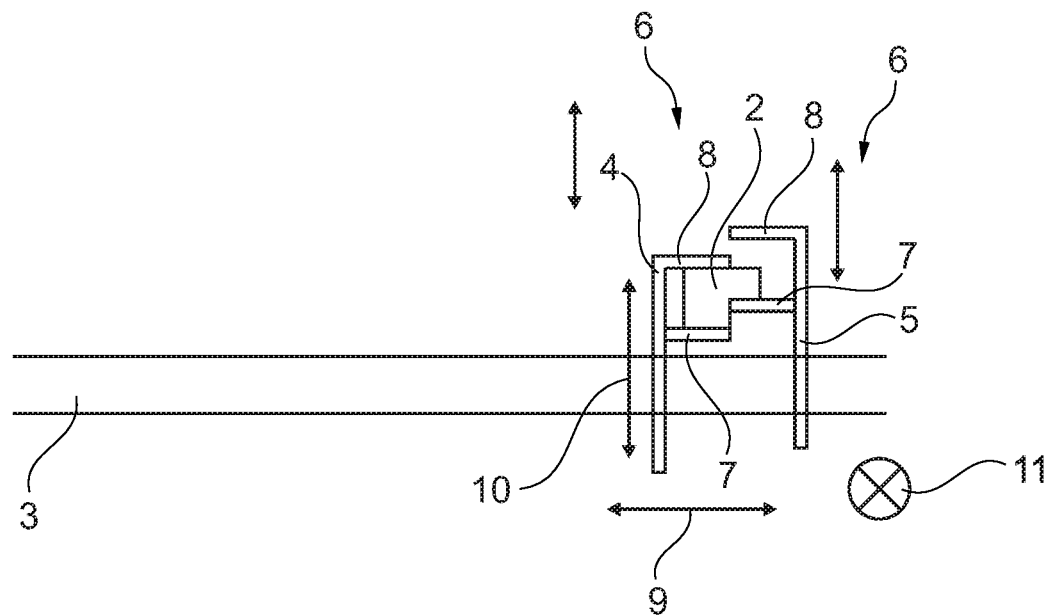
FIG. 2 shows a schematic illustration for explaining a machining device according to the invention.

FIGS. 1 and 2, in each case in a schematic illustration for explaining the invention, show an operational situation in which a machining device according to the invention can be, in order for a workpiece to be transferred from one workpiece mounting to another workpiece mounting.

The machining device 1 according to the invention, in particular for machining workpieces 2 from wood, wood materials, plastic, or the like, has at least one workpiece table 3. The workpiece 2 by means of a workpiece mounting 4, 5 can be chucked and thus held in a positionally fixed manner on the workpiece table 3, such that said workpiece 2 can be machined.

The machining device 1 according to the invention has at least one first workpiece mounting 4 for holding at least one workpiece 2, wherein furthermore at least one second workpiece mounting 5 for holding at least one workpiece 2 is provided. It is expedient herein when at least two such workpiece mountings 4, 5 are provided, because complete machining, of a workpiece 2 is in most instances not possible in one chucking, in a workpiece mounting 4, 5 such that the workpiece 2 in one chucking in one workpiece mounting, 4, 5 is only partially machined, the workpiece 2 subsequently being re-chucked in a second workpiece mounting 5, 4 and thereafter being further machined.

FIG. 1 shows that the two workpiece mountings 4, 5 are disposed so as to be remote from one another, wherein the workpiece 2 chucked in the workpiece mounting 4. The workpiece mounting 4 and also the workpiece mounting 5 herein have in each case chuck elements 6 which have first chuck jaws 7 and second chuck jaws 8 which are displaceable relative to one another so as to be able to chuck a workpiece 2 therebetween. The first chuck jaws 7 are the lower chuck jaws, for example and the second chunk jaws 8 are the upper chuck jaws, for example. It can be seen in FIG. 1 that the two workpiece mountings by way of the chuck jaws thereof are disposed at the same vertical height. This can be a vertical position in which machining of the workpiece 2 by means of a tool (not shown) can be carried out. It can be seen in FIG. 1 that the right side of the workpiece 2 is machined, while the left side of the workpiece 2 is clamped in the workpiece mounting 4.

It can be seen in FIG. 2 that the workpiece mounting 4 is displaced relative to the workpiece table 3, toward the workpiece mounting 5. The workpiece mounting 4 herein is configured so as to be repositionable relative to the workpiece mounting 5, along the direction according to the arrow 9, that is to say the longitudinal direction. The repositioning can be performed by means of a drive or manually. It can also be seen in FIG. 2 that the workpiece mounting 4 is displaced relative to the height of the workpiece mounting 5, and relative to the workpiece table 3, downward in the vertical direction according to the arrow 10. The workpiece mounting 4 herein, conjointly with the chuck jaws 7, 8 as an entirety, and conjointly with the chucked workpiece 2, is repositioned downward. The workpiece can thus be driven laterally into the diverged chuck jaws 7, 8 of the workpiece mounting 5 and be clamped therein substantially by driving down the chuck jaws 8. It is achieved on account thereof that the workpiece, offset in the vertical direction 10, is inserted into the workpiece mounting 5 and chucked in the latter.

The workpiece 2, when being, re-chucked from the first workpiece mounting 4 to the second workpiece mounting 5, can thus be positioned in at least two dimensions, thus along the arrow 9 and along the arrow 10. In the case of another exemplary embodiment it may also be advantageous when the workpiece 2 is also positionable in yet a third dimension according to the arrow 11.

The first workpiece mounting 4 herein is thus displaceable relative to the second workpiece mounting 5 in at least two, advantageously in three, dimensions, and/or the second workpiece mounting 5 is displaceable relative to the first workpiece mounting 4 in at least two, advantageously in three, dimensions. On account thereof, depending on the machining of the workpiece 2, and on the contour of said workpiece 2 after machining, said workpiece 2 can be positioned such as is required in order for said workpiece 2 to be re-chucked in the respective other workpiece mounting 4, 5

According to the exemplary embodiment of FIG. 1, one workpiece table 3, in particular only one workpiece table 3, is provided, and the first workpiece mounting 4 and/or the second workpiece mounting 5 are/is disposed so as to be displaceable relative to the workpiece table 3.

Alternatively, two, in particular displaceable, workpiece tables can also be provided, wherein the first workpiece mounting is connected to a first workpiece table and is disposed so as to be displaceable conjointly with the latter, and wherein the second workpiece mounting is connected to the second workpiece table and is disposed so as to be displaceable conjointly with the latter. This is shown in FIGS. 3 and 4.

Figure 3:
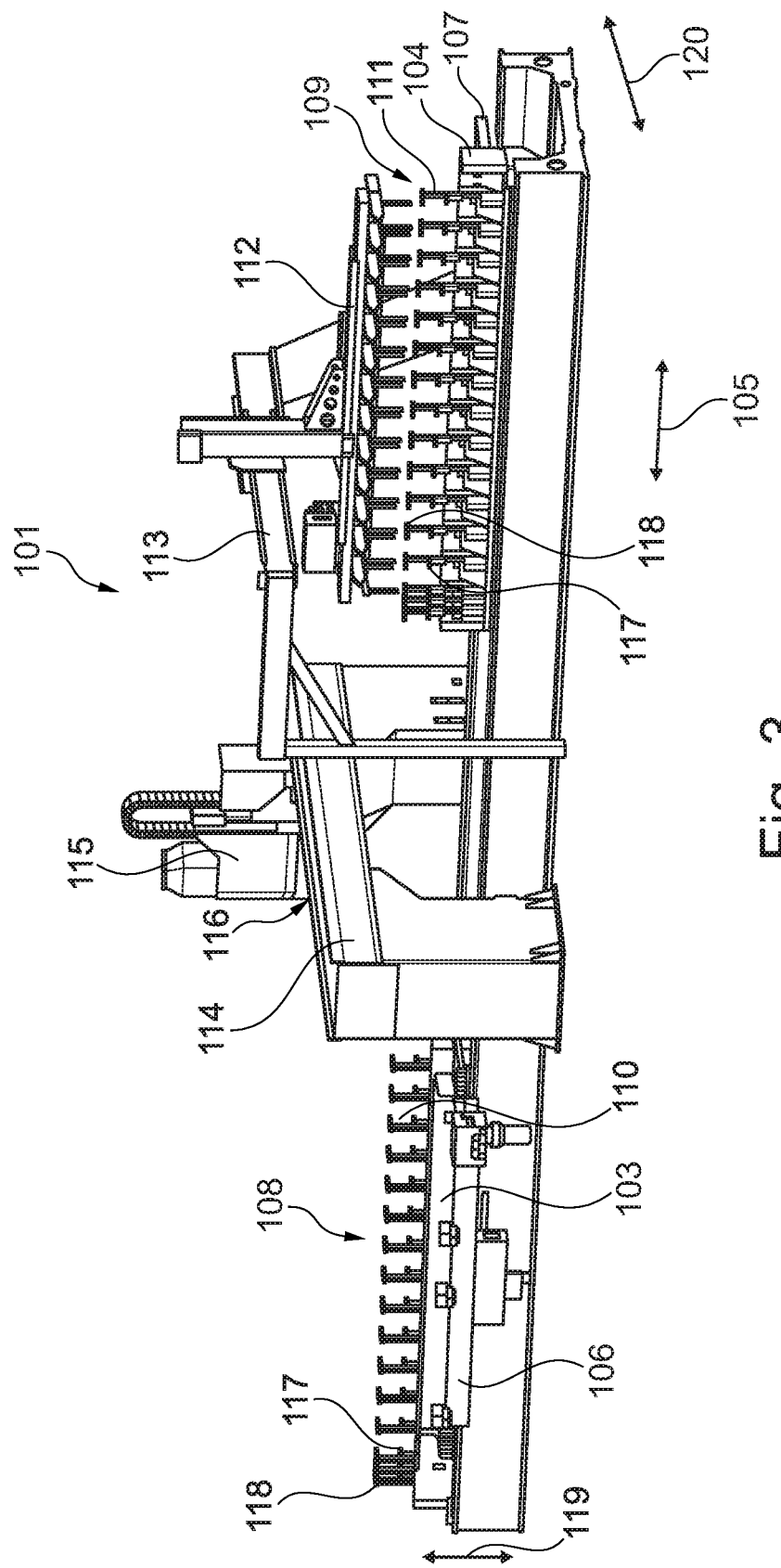
FIG. 3 shows a perspective illustration of a machining device according to the invention.
Figure 4:
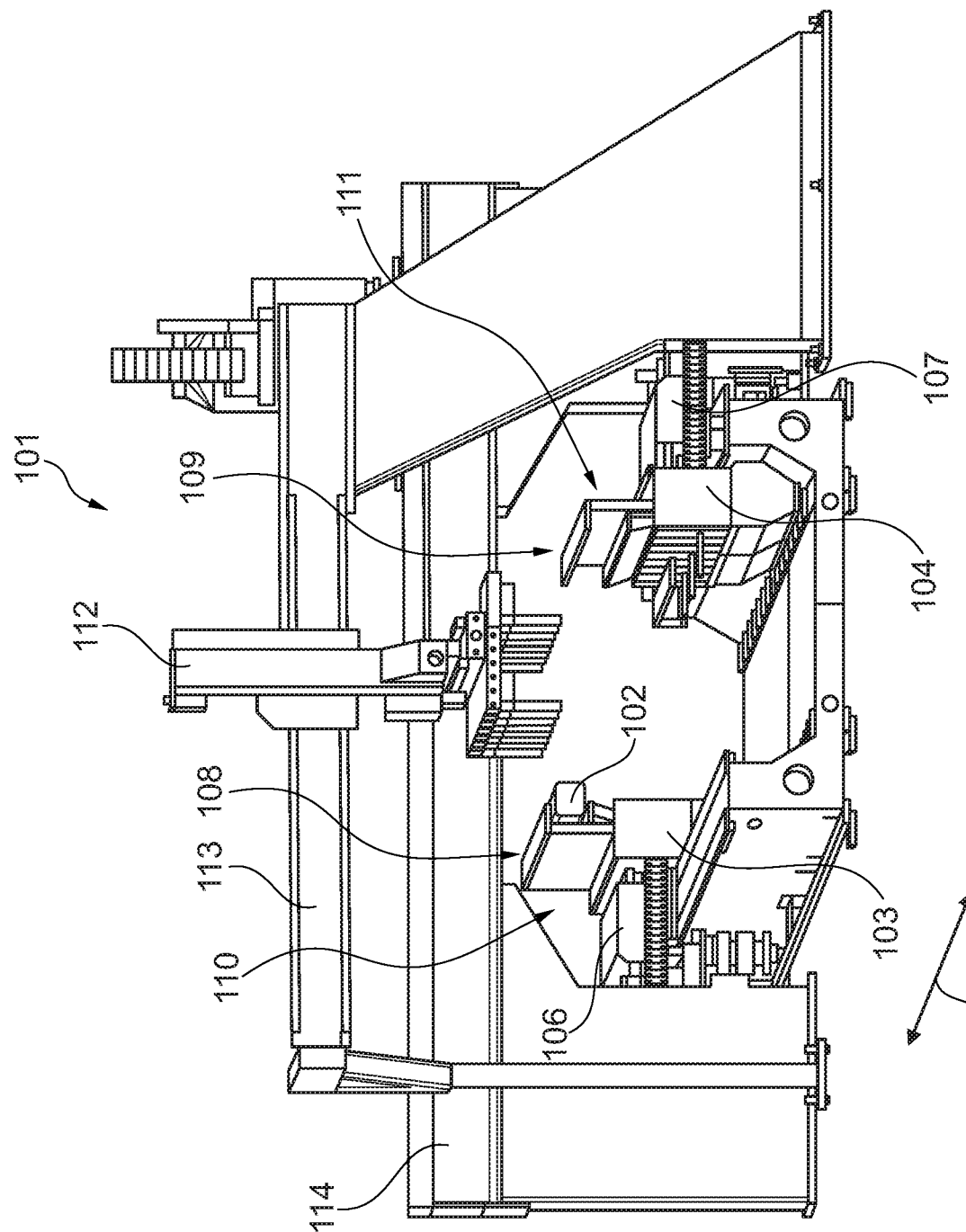
FIG. 4 shows a further perspective illustration of the machining device according to FIG. 3.

FIGS. 3 and 4 show a machining device 101, in particular for machining workpieces 102 from wood, wood materials, plastic, or the like. For example, the workpieces 102 herein can rather be elongate, beam-type workpieces, or rather be two-dimensional, board-type workpieces.

The machining device 101 has a first workpiece table 103 and a second workpiece table 104. The two workpiece tables 103, 104 are configured so as to be displaceable in the longitudinal direction thereof, according to the arrow 105, and by means of an advancing installation 106, 107 can be displaced in the longitudinal direction.

The two workpiece tables 103, 104 have in each case one workpiece mounting 108, 109 having chuck elements 110, 111 for chucking a workpiece 102, workpieces 102 by means of said chuck elements 110, 111 being able to be reliably held for machining.

A feed device 112 which serves for feeding a workpiece 102 to the workpiece mounting 108, 109 of the workpiece table 103, 104 and for placing the workpiece 102 on the respective workpiece table 103, 104 is furthermore provided.

A device frame 113 on which the feed device 112, also referred to as a manipulator, is displaceably disposed is furthermore provided. A guide device 114 which is advantageously configured as a gantry or as a traverse, on which a tool slide 115 is displaceably disposed in order to be able to displace a tool 116, is also provided. On account thereof, the workpiece 102 can be displaced in the longitudinal direction of the workpiece table 103, 104 and herein be moved past the tool 116 for machining.

The machining device 101 thus has a first workpiece mounting 108 having a plurality of first chuck elements 110 which are disposed on the first workpiece table 103, wherein the first chuck elements 110 have first chuck jaws 117 and second chuck jaws 118 which are displaceable relative to one another and in particular also relative to the first workpiece table 103 in at least one dimension or in two dimensions. The chuck jaws 117, 118 herein are displaceable relative to the workpiece table 103 at least in the vertical direction 119 and, optionally, in the direction 120 that is perpendicular to the latter.

The machining device 101 furthermore has a second workpiece mounting 109 having a plurality of first chuck elements 111 which are disposed on the first workpiece table 104, wherein the first chuck elements 111 likewise have first chuck jaws 117 and second chuck jaws 118. The two latter can likewise be displaceable relative to one another and in particular also relative to the first workpiece table 103 in at least one dimension or in two dimensions. However, the lower chuck jaw 117 herein can also be disposed so as to be stationary in the vertical direction 119, while the upper chuck jaw 118 can be configured so as to be displaceable in the vertical direction 119. Optionally, the chuck jaws 117 and/or chuck laws 118 of the workpiece table 103 and/or of the workpiece table 104 are displaceable at least in the vertical direction 119 and, optionally, in the direction 120 that is perpendicular to the latter.

Optionally, the workpiece tables 103, 104 can also be configured as to be displaceable in the longitudinal direction according to the arrow 105, and in a direction 120 that is perpendicular to the latter. The entire workpiece table does not need to be displaceable herein, but rather it would be sufficient for a type of console having the workpiece mountings to be displaceable in the direction 120. It would thus be advantageous if the first and/or the second workpiece table 103, 104 were displaceable in a first direction 120 that is perpendicular to the longitudinal direction 105.

According to one aspect of the invention, it is advantageous in the case of the exemplary embodiment of FIGS. 3 and 4 when the first chuck elements 110, or the first and/or second chuck jaws 117, 118 thereof, respectively, are in each case displaceable in a first direction 120 that is aligned so as to be perpendicular to the longitudinal direction 105, and optionally are displaceable in a second direction 119 that is aligned so as to be perpendicular to the longitudinal direction 105 and to the first direction 120, and/or the second chuck elements 111, or the first and/or second chuck jaws 117, 118 thereof, respectively, are in each case displaceable in a first direction 120 that is aligned so as to be perpendicular to the longitudinal direction 105, and optionally are displaceable in a second direction 119 that is aligned so as to be perpendicular to the longitudinal direction 105 and to the first direction 120.

Figure 5:
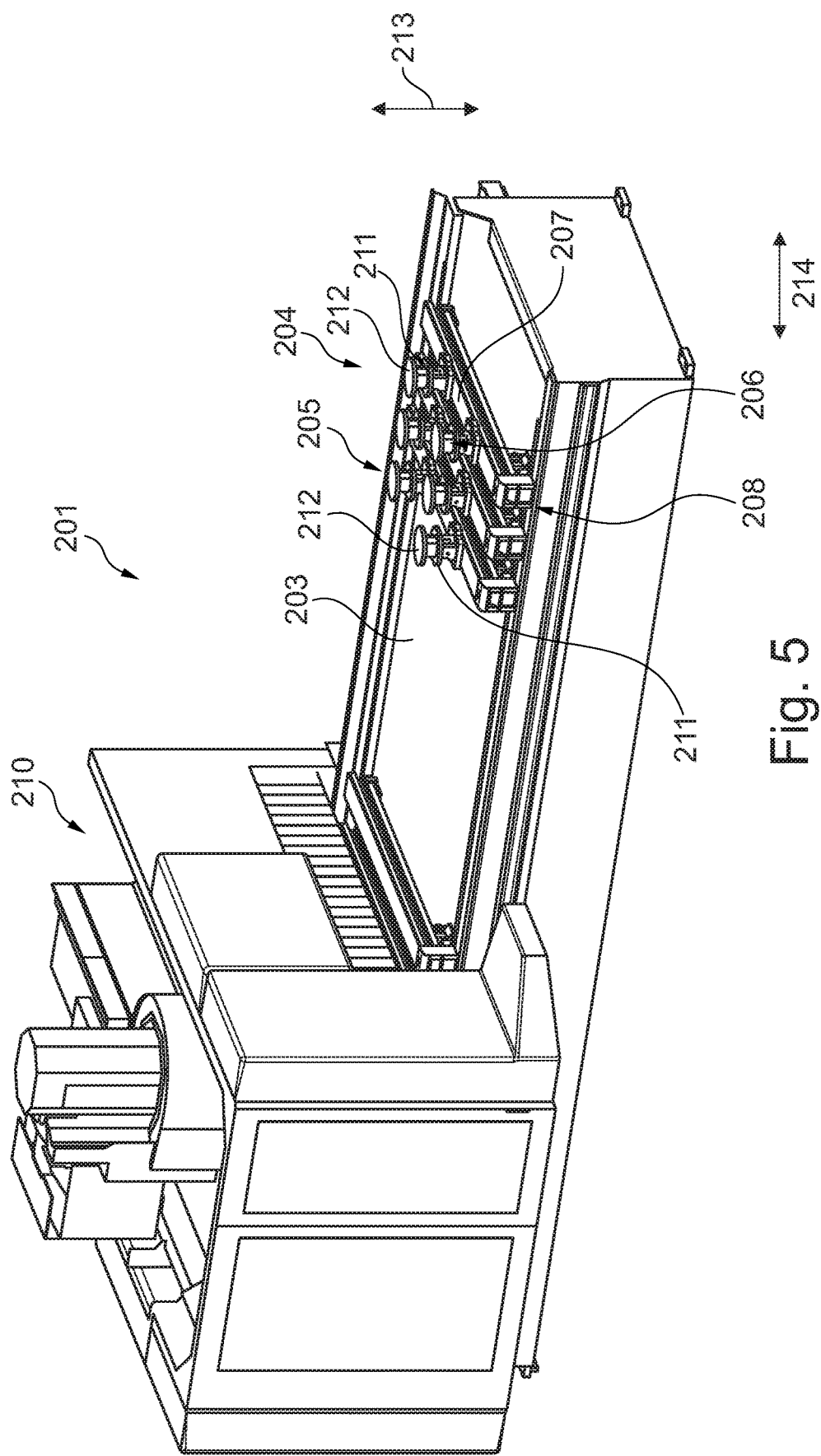
FIG. 5 shows a perspective illustration of a further machining device according to the invention.

FIG. 5 shows a further machining device 201 according to the invention, in particular for machining workpieces from wood, wood materials, plastic, or the like. For example, the workpieces herein can rather be elongate, beam-type workpieces, or rather be two-dimensional, board-type workpieces.

The machining device 201 has a main body 203. The latter is preferably disposed so as to be fixed and not displaceable. Alternatively, however, this main body 203 can also be configured so as to be displaceable.

The main body 203 has a workpiece table 204 having a plurality of chuck elements 205, 206 which serve for chucking a workpiece in order for the workpiece to be able to be reliably held for machining.

A feed device (not illustrated) which serves for feeding a workpiece to the workpiece table 204 and for placing the workpiece in the respective chuck elements 205, 206 is optionally provided.

A machining center 210 in which at least one tool slide is disposed so as to be displaceable in order to be able to displace a tool is furthermore provided. The chuck elements 205, 206 are configured so as to be displaceable relative to the main body 203 such that a workpiece can be moved into the machining center 210 by way of the chuck elements 205, 206, so as to be able to machine the workpiece in said machining center 210. Alternatively thereto, the machining center 210 can also be configured so as to be displaceable in order for said machining center 210 to be displaced above the main body in order for a workpiece to be machined.

As is shown in FIG. 5, the chuck elements 205, 206 are in each case disposed in pairs on a displaceable bridge 207 of the workpiece table 204, wherein the respective bridge 207 is guided on both sides of the main body 203.

The machining device 201, thus the workpiece table 204, has a plurality of first chuck elements 205, wherein the first chuck elements 205 have first chuck jaws 211 and second chuck jaws 212 which are displaceable relative to one another in at least one dimension or in two dimensions. The chuck jaws 211, 212 herein are displaceable relative to the main body 203 at least in the vertical direction 213 and, optionally, in the direction 214 that is perpendicular to the latter. The machining device 201 furthermore has a plurality of second chuck elements 206, wherein the second chuck elements 206 likewise have first chuck jaws 211 and second chuck jaws 212. The two latter can likewise be displaceable relative to one another in at least one dimension or in two dimensions. However, the lower chuck jaw 211 can also be disposed so as to be stationary in the vertical direction 213 herein, while the upper chuck jaw 212 can be configured so as to be displaceable in the vertical direction 213. Optionally, the chuck jaws 211 and/or chuck jaws 212 of the workpiece table 204 are displaceable at least in the vertical direction 213 and, optionally, in the direction 214 that is perpendicular to the latter.

The machining device 201 herein is configured in a corresponding manner such that the first workpiece table 204 has a plurality of first chuck elements 205 which are disposed on the main body 203, wherein the first chuck elements 205 have first and second chuck jaws 211, 212 which are displaceable relative to one another and in particular also relative to the main body 203 in at least one dimension or in two dimensions, and wherein a second workpiece table 208 has a plurality of second chuck elements 206 which are disposed on the main body 203, wherein the second chuck elements 206 have first and second chuck jaws 211, 212 which are displaceable relative to one another and in particular also relative to the main body 203 in at least one dimension or in two dimensions.

It can herein also optionally be advantageous when the first chuck elements 205, or the first and/or second chuck jaws 211, 212 thereof, respectively, are displaceable also in a third dimension, and/or the second chuck elements 206, or the first and/or second chuck jaws 211, 212 thereof, respectively are displaceable also in a third dimension.

Figure 6:
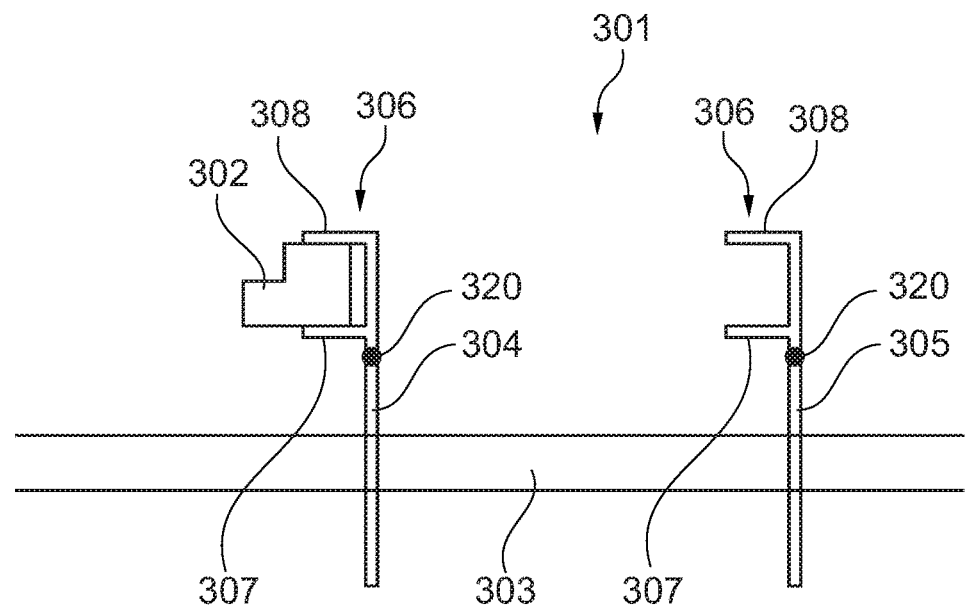
FIG. 6 shows a schematic illustration for explaining a further machining device according to the invention.
Figure 7:
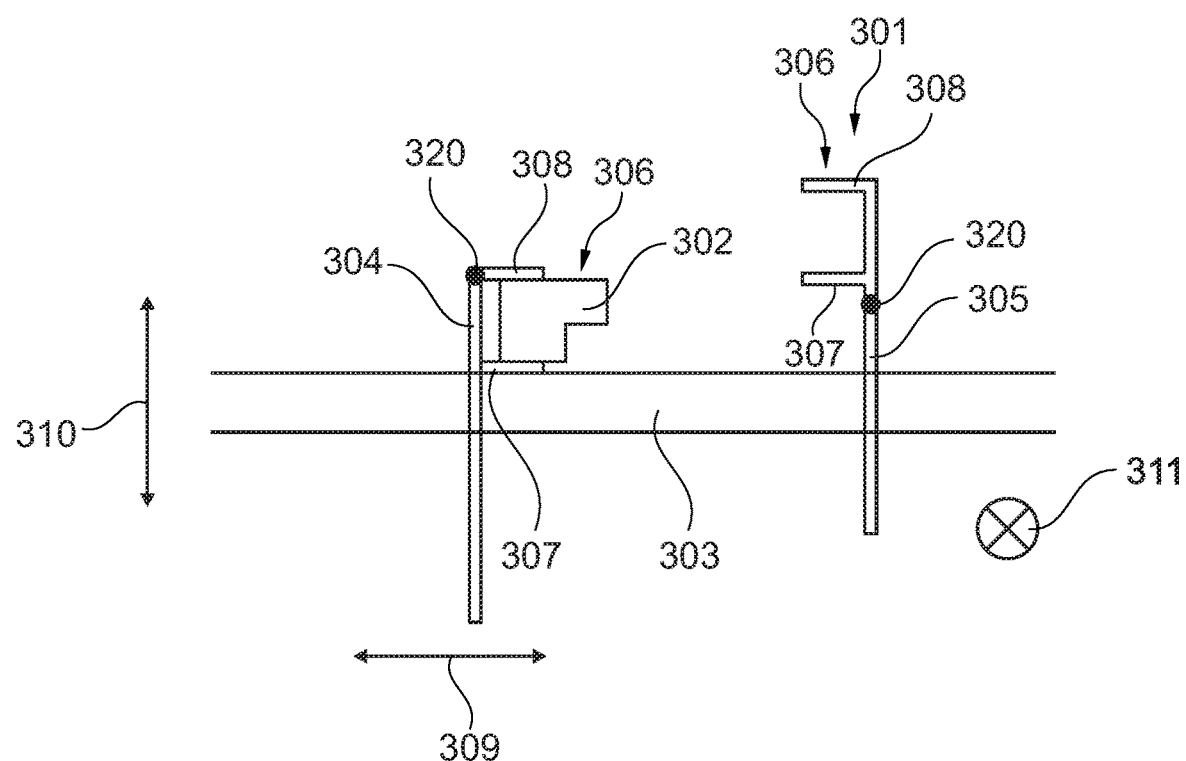
FIG. 7 shows a schematic illustration for explaining the machining device according to the invention.

FIGS. 6 and 7 show a further exemplary embodiment similar to the example of FIGS. 1 and 2. FIGS. 6 and 7, in each case in a schematic illustration for explaining the invention, show an operational situation in which a machining device according to the invention can be in order for a workpiece to transferred from one workpiece mounting to another workpiece mounting.

The machining device 301 according to the invention, in particular for machining workpieces 302 from wood, wood materials, plastic, or the like, has at least one workpiece table 303. The workpiece 302 can be chucked and thus held in a positionally fixed manner on the workpiece table 303 by means of workpiece mounting 304, 305, such that said workpiece 302 can be machined.

The machining device 301 according to the invention has at least one first workpiece mounting 304 for holding at least one workpiece 302, wherein at least one second workpiece mounting 305 for holding at least one second workpiece 302 is furthermore provided. It is expedient herein when at least two such workpiece mountings 304, 305 are provided, because complete machining of a workpiece 302 in one chucking arrangement in one workpiece mounting 304, 305 is in most instances not possible such that the workpiece 302 in one chucking arrangement in one workpiece mounting 304, 305 is only partially machined, the workpiece 2 subsequently being re-chucked in a second workpiece mounting 305, 304 and thereafter being further machined.

FIGS. 6 and 7 show that at least the workpiece mounting 304 and, optionally, also the workpiece mounting 305, or vice versa, has/have a joint 320. On account thereof, the workpiece mounting 304, 305 can be turned over, such as tilted approximately 180°, as is shown in FIG. 7, such that the workpiece 302 can be transferred from the workpiece mounting 304 to the workpiece mounting 305.

FIG. 6 shows that the two workpiece mountings 304, 305 are disposed so as to be remote from one another, wherein the workpiece 302 is chucked in the workpiece mounting 304. The workpiece mounting 304 and also the workpiece mounting 305 herein have in each case chuck elements 306 which have first chuck jaws 307 and second chuck jaws 308 which are displaceable relative to one another in order for a workpiece 302 to be able to be chucked therebetween. The first chuck jaws 307 are the lower chuck jaws, for example, and the second chuck jaws 308 are the upper chuck jaws, for example. It can be seen in FIG. 6 that the two workpiece mountings by way of the chuck jaws thereof are disposed at the same vertical height. This can be a vertical position in which machining of the workpiece 302 by means of a tool (not shown) can be carried out. It can be seen in FIG. 6 that the left side of the workpiece 302 is machined while the right side of the workpiece 302 is clamped in the workpiece mounting 304.

It can be seen in FIG. 7 that the workpiece mounting 304 is turned over and is displaced relative to the workpiece table 303 toward the workpiece mounting 305. The workpiece mounting 304 herein is configured so as to be repositionable relative to the workpiece mounting 305 along the direction according to the arrow 309, that is to say the longitudinal direction. The repositioning can be performed by means of a drive or manually. It can also be seen in FIG. 7 that the workpiece mounting 304 is displaced relative to the height of the workpiece mounting 305, and relative to the workpiece table 303, downward in the vertical direction according to the arrow 310. The workpiece mounting 304 herein, conjointly with the chuck jaws 307, 308 as an entirety, and conjointly with the chucked workpiece 302, is repositioned downward. The workpiece can thus be driven laterally into the diverged chuck jaws 307, 308 of the workpiece mounting 305 and be clamped therein substantially by driving down the chuck jaws 308. It is achieved on account thereof that the workpiece, offset in the vertical direction 310, is inserted into the workpiece mounting 305 and chucked in the latter.

The workpiece 302, when being re-chucked from the first workpiece mounting 304 to the second workpiece mounting 305, can thus be positioned in at least two dimensions, thus along the arrow 309 and along the arrow 310. In the case of another exemplary embodiment it may also be advantageous when the workpiece 302 is also positionable in yet a third dimension according to the arrow 311.

The first workpiece mounting 304 herein is thus displaceable relative to the second workpiece mounting 305 in at least two, advantageously in three, dimensions, and/or the second workpiece mounting 305 is displaceable relative to the first workpiece mounting 304 in at least two, advantageously in three, dimensions. On account thereof, depending on the machining of the workpiece 302, and on the contour of said workpiece 302 after machining, said workpiece 302 can be positioned such as is required in order for said workpiece 302 to be re-chucked in the respective other workpiece mounting 304, 305.

According to the exemplary embodiment of figure one workpiece table 303, in particular only one workpiece table 303, is provided, and the first workpiece mounting 304 and/or the second workpiece mounting 5 are/is disposed so as to be displaceable relative to the workpiece table 303.

Alternatively, two, in particular displaceable, workpiece tables can also be provided, wherein the first workpiece mounting in this instance is connected to a first workpiece table and is disposed so as to be displaceable conjointly with the latter, and wherein the second workpiece mounting is connected to the second workpiece table and is disposed so as to be displaceable conjointly with the latter.

The devices according to the invention permit the machining of a workpiece on three of the four encircling edges in a first chucking arrangement, such that a fourth edge of the workpiece is machinable after re-chucking. The devices according to the invention also permits the machining of a workpiece on two of the four encircling edges in a first chucking arrangement, such that a third and a fourth edge of the workpiece are machinable after re-chucking.

LIST OF REFERENCE SIGNS

1 Machining device
2 Workpiece
3 Workpiece table
4 First workpiece mounting
5 Second workpiece mounting
6 Chuck element
7 First chuck jaw
8 Second chuck jaw
9 Arrow, or longitudinal direction, respectively
10 Arrow, or vertical direction, respectively
11 Arrow
101 Machining device
102 Workpiece
103 First workpiece table
104 Second workpiece table
105 Arrow, or longitudinal direction, respectively
106 Advancing installation
107 Advancing installation
108 First workpiece mounting
109 Second workpiece mounting
110 First chuck element
111 Second chuck element
112 Feed device 113 Device frame
114 Guide device
115 Tool slide
116 Tool
117 First chuck jaw
118 Second chuck jaw
119 Vertical direction
120 Perpendicular direction
201 Machining device
203 Main body
204 Workpiece table
205 First chuck element
206 Second chuck element
207 Bridge
208 Workpiece table
210 Machining center
211 First chuck jaw
212 Second chuck jaw
213 Vertical direction
214 Direction
301 Machining device
302 Workpiece
303 Workpiece table
304 First workpiece mounting
305 Second workpiece mounting
306 Chuck element
307 First chuck jaw
308 Second chuck jaw
309 Arrow, or longitudinal direction, respectively
310 Arrow, or vertical direction, respectively
311 Arrow
320 Joint

The invention claimed is:

1. A machining device for machining workpieces comprising wood, wood materials, or plastic, the device comprising
at least one workpiece table having a first workpiece mounting for holding at least one workpiece and a second workpiece mounting for holding the at least one workpiece,
wherein the workpiece table is adapted such that the at least one workpiece is movable in at least two dimensions when being re-chucked from the first workpiece mounting to the second workpiece mounting,
wherein the first workpiece mounting is displaceable relative to the second workpiece mounting in three dimensions or the second workpiece mounting is displaceable relative to the first workpiece mounting in in three dimensions.

2. The machining device as claimed in claim 1,
wherein only one workpiece table is provided, and the first workpiece mounting or the second workpiece mounting is disposed so as to be displaceable relative to the workpiece table.

3. The machining device as claimed in claim 1,
wherein two displaceable workpiece tables are provided, wherein the first workpiece mounting is connected to a first workpiece table and is disposed so as to be displaceable conjointly with the first workpiece table, and the second workpiece mounting is connected to the second workpiece table and is disposed so as to be displaceable conjointly with the second workpiece table.

4. The machining device as claimed in claim 3,
wherein the first workpiece mounting has a plurality of first chuck elements which are disposed on the first workpiece table, wherein each of the first chuck elements has first and second chuck jaws which are displaceable in at least one dimension relative to one another and relative to the first workpiece table, and
wherein the second workpiece mounting has a plurality of second chuck elements which are disposed on the second workpiece table, wherein each of the second chuck elements has first and second chuck jaws which are displaceable in at least one dimension relative to one another and relative to the second workpiece table.

5. The machining device as claimed in claim 4,
wherein the first or the second workpiece table is displaceable in a longitudinal direction.

6. The machining device as claimed in claim 5,
wherein the first or the second workpiece table is displaceable in at least one first direction that is perpendicular to the longitudinal direction.

7. The machining device as claimed in claim 5,
wherein the plurality of first chuck elements, or the first or second chuck jaws thereof, respectively, are in each case displaceable in a first direction that is aligned so as to be perpendicular to the longitudinal direction, or
the plurality of second chuck elements, or the first or second chuck jaws thereof, respectively, are in each case displaceable in a first direction that is aligned so as to be perpendicular to the longitudinal direction.

8. The machining device as claimed in claim 2,
wherein the one workpiece table is disposed so as not to be displaceable.

9. The machining device as claimed in claim 8,
wherein the first workpiece mounting has a plurality of first chuck elements which are disposed on the workpiece table, wherein the first chuck elements have first and second chuck jaws which are displaceable in at least one dimension relative to one another and relative to the workpiece table, and
wherein the second workpiece mounting has a plurality of second chuck elements which are disposed on the workpiece table, wherein the second chuck elements have first and second chuck jaws which are displaceable in at least one dimension relative to one another and relative to the workpiece table.

10. The machining device as claimed in claim 9,
wherein the first chuck elements, or the first or second chuck jaws thereof, respectively, are displaceable also in a third dimension, or
the second chuck elements, or the first or second chuck jaws thereof, respectively, are displaceable also in a third dimension.

11. The machining device as claimed in claim 1,
further comprising a feed device configured to feed a workpiece to one of the workpiece mountings.

12. The machining device as claimed in claim 1,
wherein the workpiece table is adapted such that the at least one workpiece is movable in three dimensions when being re-chucked from the first workpiece mounting to the second workpiece mounting.

13. The machining device as claimed in claim 6,
wherein the first or the second workpiece table is displaceable in two directions that are perpendicular to the longitudinal direction.

14. The machining device as claimed in claim 7,
wherein the plurality of first chuck elements, or the first or second chuck jaws thereof, respectively, are in each case displaceable in a first direction that is aligned so as to be perpendicular to the longitudinal direction and in a second direction that is aligned so as to be perpendicular to the longitudinal direction and to the first direction, or the plurality of second chuck elements, or the first or second chuck jaws thereof, respectively, are in each case displaceable in a first direction that is aligned so as to be perpendicular to the longitudinal direction and are displaceable in a second direction that is aligned so as to be perpendicular to the longitudinal direction and to the first direction.

15. A machining device for machining workpieces comprising wood, wood materials, or plastic, the device comprising at least one workpiece table having a first workpiece mounting for holding at least one workpiece and a second workpiece mounting for holding the at least one workpiece, wherein the workpiece table is adapted such that the at least one workpiece is movable in at least two dimensions when being re-chucked from the first workpiece mounting to the second workpiece mounting, wherein two displaceable workpiece tables are provided, wherein the first workpiece mounting is connected to a first workpiece table and is disposed so as to be displaceable conjointly with the first workpiece table, and the second workpiece mounting is connected to the second workpiece table and is disposed so as to be displaceable conjointly with the second workpiece table, wherein the first workpiece mounting has a plurality of first chuck elements which are disposed on the first workpiece table, wherein each of the first chuck elements has first and second chuck jaws which are displaceable in at least one dimension relative to one another and relative to the first workpiece table, and wherein the second workpiece mounting has a plurality of second chuck elements which are disposed on the second workpiece table, wherein each of the second chuck elements has first and second chuck jaws which are displaceable in at least one dimension relative to one another and relative to the second workpiece table, wherein each of the first chuck elements has first and second chuck jaws which are displaceable in two dimensions relative to one another and relative to the first workpiece table, and wherein each of the second chuck elements has first and second chuck jaws which are displaceable in two dimensions relative to one another and relative to the second workpiece table.

16. The machining device as claimed in claim 15,
wherein the first workpiece mounting is displaceable relative to the second workpiece mounting in at least two dimensions, or the second workpiece mounting is displaceable relative to the first workpiece mounting in at least two dimensions.

17. The machining device as claimed in claim 15,
wherein the first or the second workpiece table is displaceable in a longitudinal direction.

18. The machining device as claimed in claim 17,
wherein the first or the second workpiece table is displaceable in at least one first direction that is perpendicular to the longitudinal direction.

19. The machining device as claimed in claim 17,
wherein the plurality of first chuck elements, or the first or second chuck jaws thereof, respectively, are in each case displaceable in a first direction that is aligned so as to be perpendicular to the longitudinal direction, or the plurality of second chuck elements, or the first or second chuck jaws thereof, respectively, are in each case displaceable in a first direction that is aligned so as to be perpendicular to the longitudinal direction.

20. The machining device as claimed in claim 15,
further comprising a feed device configured to feed a workpiece to one of the workpiece mountings.

21. The machining device as claimed in claim 15,
wherein the workpiece table is adapted such that the at least one workpiece is movable in three dimensions when being re-chucked from the first workpiece mounting to the second workpiece mounting.

22. The machining device as claimed in claim 18,
wherein the first or the second workpiece table is displaceable in two directions that are perpendicular to the longitudinal direction.

23. The machining device as claimed in claim 19,
wherein the plurality of first chuck elements, or the first or second chuck jaws thereof, respectively, are in each case displaceable in a first direction that is aligned so as to be perpendicular to the longitudinal direction and in a second direction that is aligned so as to be perpendicular to the longitudinal direction and to the first direction, or the plurality of second chuck elements, or the first or second chuck jaws thereof, respectively, are in each case displaceable in a first direction that is aligned so as to be perpendicular to the longitudinal direction and are displaceable in a second direction that is aligned so as to be perpendicular to the longitudinal direction and to the first direction.

* * * * *